United States Patent
Stoval, III et al.

(10) Patent No.: US 6,411,299 B1
(45) Date of Patent: Jun. 25, 2002

(54) PROCESSING TEXT FOR DISPLAY ON MEDICAL IMAGES

(75) Inventors: William M. Stoval, III, Mt. Prospect, IL (US); Matthew W. Turek, Glenville, NY (US); David P. Edwards, Highland, UT (US); David M. Deaven, Waukesha, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/475,376

(22) Filed: Dec. 30, 1999

(51) Int. Cl.[7] .............................................. G06T 11/00
(52) U.S. Cl. ........................ 345/467; 345/471; 707/517
(58) Field of Search ................................ 707/523, 530, 707/531, 542, 512; 345/467, 629, 630, 471; 382/128, 115, 276

(56) References Cited

U.S. PATENT DOCUMENTS 5,621,875 A * 4/1997 Mason et al. ................ 707/793
5,734,915 A * 3/1998 Roewer ....................... 707/773
5,845,303 A 12/1998 Templeman ................. 705/517

OTHER PUBLICATIONS

The Sun™ Ultra™ 5 and Ultra 10 Workstation Architecture, Technical White Paper, Sun Microsystems, Inc., May 1999, pp. 1–52.

* cited by examiner

Primary Examiner—Michael Razavi
Assistant Examiner—Faranak Fouladi
(74) Attorney, Agent, or Firm—Quarles & Brady LLP

(57) ABSTRACT

A graphic workstation receives digitized medical images and the user creates textual information that is to be displayed on the images. The text along with associated properties are packaged as a data structure along with a set of properties, and the data structure is passed through a pipeline having a series of formatters. The formatters are easily configured by the user to modify the properties of the text data structures as they flow through the pipeline prior to being rendered on a display.

12 Claims, 3 Drawing Sheets

PROCESSING TEXT FOR DISPLAY ON MEDICAL IMAGES

BACKGROUND OF THE INVENTION

The field of the invention is medical imaging, and particularly, the processing of textual information for display on medical images.

Text is often overlaid on top of medical images prior to review by a doctor or medical technologist. The medical images are two or three-dimensional arrays of digitized data that are produced by imaging equipment such as MRI systems, x-ray systems, CT scanners, PET scanners and nuclear medicine systems. This digital data is downloaded to a workstation where textual information is added by rendering characters on top of the displayed image.

Text strings are often displayed on medical images to show patient information, image attributes and properties. Text strings are also displayed on images at the user's prompting to reference an image or a specific part of anatomy on an image. There are many ways of displaying text strings, and many options that can be customized. Some of these options are standard display parameters such as font, color, bold, italic, underline, etc., but some options are very customized and need to be designed for each specific application. For instance, when displaying grayscale text over an anatomic image, it can be made more readable by adding a shadow to the text. This shadow (and the shade of the text itself) may need to change based upon the shades of gray in the medical image underneath the text. These custom parameters may need to be done in a certain order. For instance, determining the color of a shadow may need to be done after determining the color of the text itself, so as to provide the right amount of contrast. Custom parameters may need to be modified and/or added at run-time also, so the ability to support new parameters and to change old parameters needs to be easily extensible.

SUMMARY OF THE INVENTION

The present invention enables textual information or labels to be added to medical images. More specifically, textual information is packaged as an object along with a set of properties information and the object is passed through a pipeline comprised of a set of formatters which each are configured to set certain properties in the object. The text is rendered to a display using the formatted properties information in the object. The pipeline and the individual formatters are easily configurable and enable text to be rendered in an optimal manner on each medical image.

DESCRIPTION OF THE PREFERRED EMBODIMENT

Figure 1:
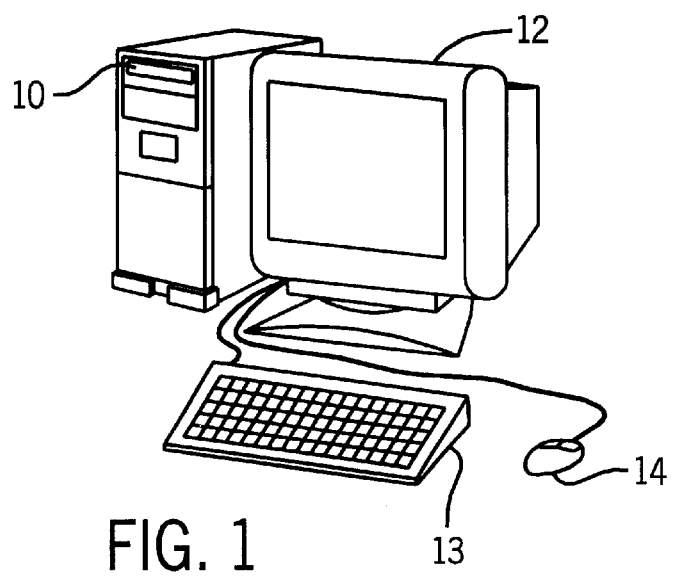
FIG. 1 is a perspective view of a workstation which has been modified to practice the preferred embodiment of the invention.

The preferred embodiment of the invention is employed in a workstation. As shown in FIG. 1 the workstation includes a mini-tower 10 which houses the processor and associated circuitry, memory, and peripheral interface circuits. One of the peripheral devices is a commercially available CRT monitor 12 which connects to a graphics circuit housed in the mini-tower 10, and another peripheral device is a keyboard 13 and mouse 14 that connects to a PCI-based Ethernet controller in the mini-tower 10. An operator may input data through the keyboard 13 and control the position of a cursor on the monitor display using the mouse 14. The workstation 10 may operate as a stand alone graphic display system, or it may be connected to receive digitized image data directly from a medical imaging system such as an x-ray system, x-ray CT system, MRI system, PET scanner system or nuclear medicine system. The workstation 10 typically contains application programs which perform image processing functions, such as, filtering the medical transforming the size and orientation of the medical images and adding textual information to the medical images.

Figure 2:
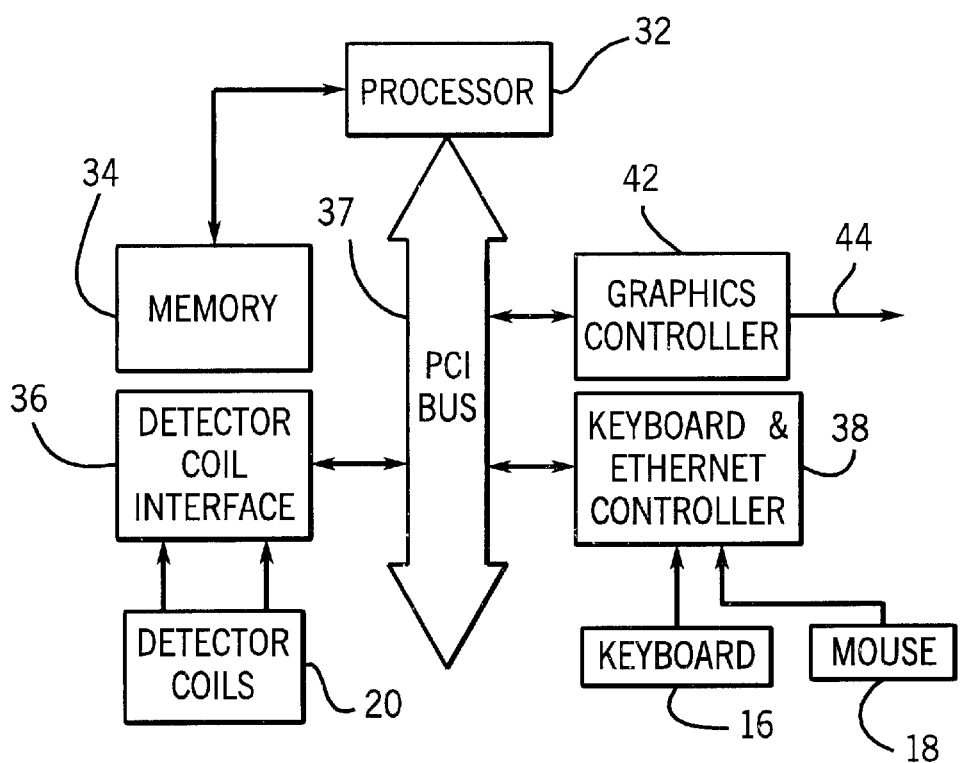
FIG. 2 is an electrical block diagram of the workstation of FIG. 1.

Referring particularly to FIG. 2, the workstation includes a processor 20 which executes instructions stored in a memory 22. The processor 20 is a commercially available device sold by Sun Microsystems, Inc. under the trademark UltraSPARC-lli. It incorporates on-chip memory and I/O control to facilitate system integration. It is a superscalar processor implementing the SPARC-V9 64-bit RISC architecture and executing the instruction set sold commercially under the trademark "VIS". It also includes an integral PCI bus driver which provides a direct interface with a 32-bit PCI bus 24. It also includes integral memory management circuitry for handling all external memory 22.

The PCI bus 24 is an industry standard bus that transfers 32-bits of data at 33 MHz between the processor 20 and a number of peripheral controller cards. These include a PCI EIDE controller 26 which provides a high-speed transfer of data to and from a CD ROM drive 28 and a disc drive 30. An Ethernet controller 32 supports data transfer with a number of peripheral devices, including input from the keyboard and mouse 14 and communication with Ethernet ports on medical imaging equipment. And finally, a graphics controller 34 couples the PCI bus 24 to the CRT monitor 12 through a standard VGA connection 36.

Figure 3:
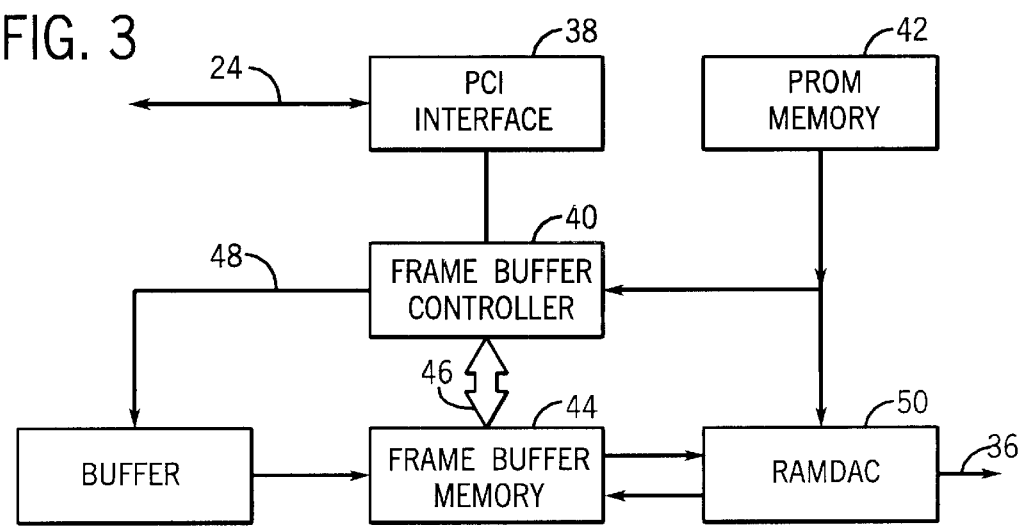
FIG. 3 is an electrical block diagram of a graphics controller which forms part of the workstation of FIGS. 1 and 2.

Referring particularly to FIGS. 2 and 3, the graphics controller 34 is interfaced with the PCI bus 24 by a PCI interface 38. The graphics controller 34 provides 8-bit or 24-bit color high performance graphics functions to the user. In the preferred embodiment the graphics functions defined under the standard identified with the Silicon Graphics, Inc. trademark "OpenGL" are supported by the graphics controller 34. The graphics controller 34 includes a frame buffer controller 40 that operates in response to instructions stored in a PROM memory 42 to perform requested graphic functions. These functions include providing the latter half of 3D graphics rendering pipeline functions, providing acceleration for windowing functions and complex graphics applications. It also performs pixel processing to accelerate functionality such as transparency and antialiasing. It also provides rendering acceleration for dot, line, text, triangles, and fill patterns, as well as windowing functions, including fill, scroll, text, two and three dimensional vectors, and polygons.

Image data which is processed by the frame buffer controller 40 is stored in a frame buffer memory 44. The frame buffer 44 is coupled to the controller 40 by a 36-bit data bus 46, and image data is written to and read from the frame buffer 44 under the direction of control signals and address signals on a control bus 48. The frame buffer memory 44 is also connected to a RAMDAC circuit 50 which converts digital pixel values into analog signals and sends them through standard VGA connection 36 to the monitor 12. The RAMDAC 50 supports the simultaneous display of 8-bit and 24-bit color images and provides video timing for a number of different image resolutions.

Referring particularly to FIG. 2, medical images may be input to the workstation in a number of ways. In the preferred embodiment the workstation is connected directly to the medical imaging equipment through an Ethernet link. The image data is downloaded to the workstation through the Ethernet controller 32 and stored in memory 22. A number of image processing functions may be performed on the image data in the memory 22. A two-dimensional image may be displayed on the monitor 12 by transferring the two-dimensional array of pixel data to the graphics controller 34 which produces the corresponding analog signals for the monitor 12. The array of image pixel data output to the graphics controller 34 is stored in the frame buffer memory 44. The frame buffer controller 40 operates in concert with the RAMDAC 50 to produce a corresponding display on monitor 12.

Figure 5:
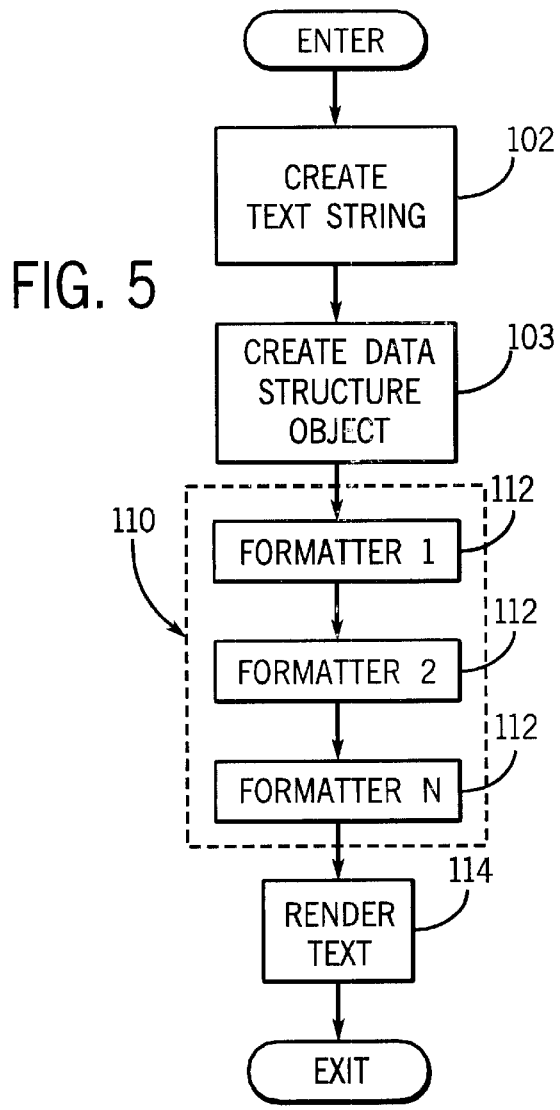
FIG. 5 is a flow chart which illustrates the text formatting pipeline used to practice the preferred embodiment of the invention.

Referring particularly to FIG. 5, an application program which enables textual information and labels to be rendered on an image being displayed includes means for inputting textual information. Using the keyboard and mouse 14, for example, the operator may create textual information or labels which are to be added to the displayed image as indicated at process block 102. This textual information may be, for example, information concerning the medical imaging system and the prescription used to acquire the image data, or it may be information about the patient or the anatomy depicted by the image.

Figure 4:
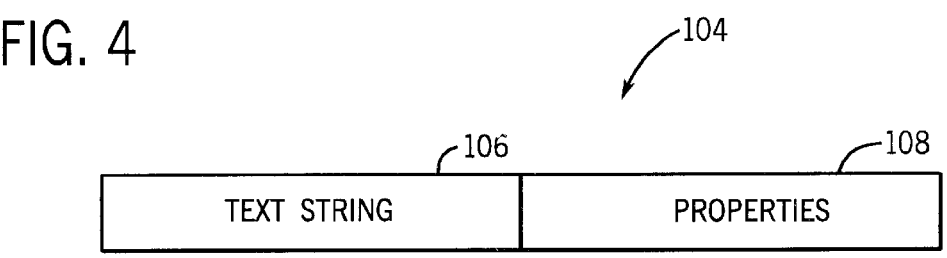
FIG. 4 is a pictorial representation of a text object data structure.

As indicated at process block 103, the text string is packaged as a text data structure object 104, comprised of a text string 106 and a set of properties 108 as shown in FIG. 4. The text string is a set of ASCII characters and the properties indicate how these characters are to be rendered on the display monitor 12. The properties are set to default values determined by the particular application program being run. In the preferred embodiment these properties include the following:

PreLabel—A label appended to the front of the text when rendered;

PostLabel—A label appended to the end of the text when rendered;

Font—The text font chosen from a font cache;

Keyword—A unique identifier for this text object;

Group—A user-defined field for optionally storing information about a group. The group can be used for such things as controlling the level of detail. For example, all the items of text are assigned to groups 1 through 5 and the user may select to see only some of the groups in order to reduce the complexity of the displayed text.

Color—The color of the text;

Opacity—The opacity of the text;

LineNumber—What line number to draw the text on (the object doing the rendering is responsible for determining the pixel position based on this line number if the Position property is not set);

Position—The position of the text;

Orientation—The orientation of the text;

Shadow—The text shadow.

It can be appreciated by those skilled in the art that many other properties can be added to this list.

Referring particularly to FIG. 5, the text object is then passed through a formatting pipeline 110 comprised of a series of formatters 112. Anywhere from zero to n formatters 112 may be employed in the pipeline 110 and these may be added or deleted from the pipeline 110 by the particular application program being run. For example, one application may configure the pipeline 110 to have only one or two formatters 112 in the pipeline 110 and another application program may configure the pipeline 110 with six or seven formatters 112. As the text data structure object 104 passes through the pipeline 110, each formatter 112 therein operates to format the properties 108 therein in a particular manner. Example formatter programs are as follows:

1. Font—This establishes font properties including size, bold, italic, color, etc.

2. Shadow—Sets properties such as shadow color, shadow width, etc. This formatter will often come after the font formatter so that the shadow color can be modified according to the font color.

3. Alignment—This is used to perform operations such as right-flush for text. This formatter usually comes after the font formatter (and after the shadow formatter if there is one) so that it can use the dimensions of the text strings to determine where to anchor the text so that it is correctly flushed.

4. Label—This formatter adds a label before (or after) text strings. For example, labels such as "Patient Name," "Date," "Lbs.," "inches" may be selectively added.

5. Orientation—This formatter is used to determine whether the text should be displayed horizontally or vertically.

6. Internationalization—For this formatter the input text strings are keys, and this formatter looks up internationalized text strings based on those keys, setting the text strings to be the internationalized strings corresponding with the keys. A property on this formatter is the language that it should use to convert from the keys to the strings.

It should be apparent that many other formatter functions are possible and may be enabled to operate on the text data structure object 104 as it passes through the pipeline 110. It is an advantage of the pipeline architecture that new formatters 112 can be easily written to carry out a specific process on the text data structure object 104 and selectively added to the pipeline 110. It is another advantage of this architecture that formatters can be added or removed from the pipeline 110 at run-time based on property settings, environmental variables, or in response to input from the user. This provides improved flexibility in adding text to medical images.

Figure 6:
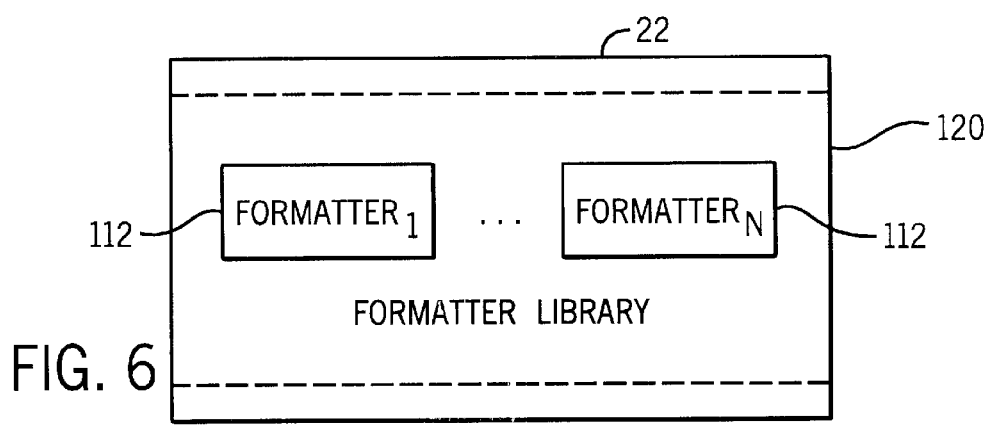
FIG. 6 is a pictorial representation of a memory component used to practice the present invention.

Referring to FIGS. 3, 4 and 5 after the text data structure object 104 passes through the pipeline 110, the text therein is rendered on the monitor 12 as indicated at process block 114. This is accomplished in the preferred embodiment by the frame buffer controller 40. The OpenGL® programs executed by the controller 40 interpret the properties 108 in the text data structure object 104 to render the text string 106. As a result, the text string is written into the frame buffer memory 44 with the desired format. Another aspect of the present invention is the ability to easily configure the pipeline 110. As shown in FIG. 6, the memory 22 stores many formatter programs 112 in a formatter library 120. By performing a configuration function, the user is given access to this library 120 and allowed to select the particular formatters 112 to be used in the pipeline 110 and their order. In most applications, an application program will configure the pipeline 110 by selecting formatters 112 from the library 120 as a normal part of its initialization. However, at run-time, the user can also override the programmed pipeline configuration using an editor program that enables formatters 112 to be added and deleted from the pipeline 110. The editor program also enables the user to create new formatters 1 12 which may be used immediately in the pipeline 110 and saved in the library 120.

What is claimed is:

1. A method for rendering text on a medical image, the steps comprising:

a) producing text data;

b) producing a text data structure object comprised of the text data and a set of properties data;

c) passing the text data structure object through a pipeline comprised of a plurality of formatters, each formatter performing a programmed operation on the properties data in the text data structure; and d) rendering the text data structure object on a medical image by employing the properties data therein to format the text data therein.

2. The method as recited in claim 1 which includes configuring the pipeline by selecting the plurality of formatters from a set of formatters stored in a formatter library.

3. The method as recited in claim 2 which includes creating a formatter for use in the pipeline.

4. The method as recited in claim 3 which includes storing the created formatter in the formatter library.

5. The method as recited in claim 1 in which the properties data includes font data, and one of the formatters in the pipeline performs the operation of setting the font data to a particular value.

6. The method as recited in claim 1 in which the properties data includes color data, and one of the formatters in the pipeline performs the operation of setting the color data to a particular value.

7. The method as recited in claim 6 in which the properties data includes shadow data, and one of the formatters in the pipeline performs the operation of setting the shadow data to a particular value that is determined in part by the color data.

8. A workstation for rendering text on a medical image, which comprises:

a display for producing a medical image;

means for producing text data;

means for producing a text data structure object which includes the text data and a set of properties data;

a formatter pipeline comprised of a plurality of formatters each formatter performing a programmed operation on the properties data in the text data structure object when it is passed through the formatter pipeline; and a graphics controller which receives the formatted text data structure object and renders that text data on the display by employing the associated properties data.

9. The workstation as recited in claim 8 which includes:

a formatter library which stores a plurality of different formatters; and means for selecting formatters in said formatter library for use in the formatter pipeline.

10. The workstation as recited in claim 8 in which one of the formatters in the pipeline is operable to control the properties data in a text data structure object to determine the font of the rendered text.

11. The workstation as recited in claim 8 in which one of the formatters in the pipeline is operable to control the properties data in a text data structure object to determine the color of the rendered text.

12. The workstation as recited in claim 11 in which one of the formatters in the pipeline is operable to control the properties data in a text data structure object to produce a shadow for the rendered text that is determined in part by the color of the rendered text.

* * * * *